United States Patent
Rideg (10) Patent No.: US 10,107,399 B2
(45) Date of Patent: Oct. 23, 2018

(54) SEALING JOINT AND A METHOD FOR MANUFACTURING THEREOF

(71) Applicant: Gabor Fazekas, Budapest (HU)

(72) Inventor: Mihaly Rideg, Budapest (HU)

(73) Assignee: Gabor Fazekas, Budapest (HU)

( * ) Notice: Subject to any disclaimer, the term of this patent is extended or adjusted under 35 U.S.C. 154(b) by 17 days.

(21) Appl. No.: 15/326,584

(22) PCT Filed: Jul. 18, 2014

(86) PCT No.: PCT/HU2014/000060
§ 371 (c)(1),
(2) Date: Jan. 16, 2017

(87) PCT Pub. No.: WO2016/009235
PCT Pub. Date: Jan. 21, 2016

(65) Prior Publication Data
US 2017/0211702 A1    Jul. 27, 2017

(51) Int. Cl.
*F16J 15/04* (2006.01)
*B65D 83/68* (2006.01)
(Continued)

(52) U.S. Cl.
CPC .............. *F16J 15/04* (2013.01); *B29C 65/565* (2013.01); *B29C 65/64* (2013.01); *B29C 66/742* (2013.01); *B65D 83/687* (2013.01); *F16J 15/108* (2013.01)

(58) Field of Classification Search
CPC ........ F16J 15/04; B29C 65/565; B29C 65/64; B29C 66/742
See application file for complete search history.

(56) References Cited

U.S. PATENT DOCUMENTS

| 6,296,156 B1 | 10/2001 | L'Oreal |
| 8,418,996 B2 * | 4/2013 | Rideg ................. B05B 11/3077 222/402.1 |

(Continued)

FOREIGN PATENT DOCUMENTS

| EP | 1052190 | 11/2000 |
| EP | 2028131 | 2/2009 |

OTHER PUBLICATIONS

European Patent Office, Notification of Transmittal (Form PCT/ISA/220, 1 pg.), International Search Report (Form PCT/ISA/210, 4 pgs.) and Written Opinion of the International Searching Authority (Form PCT/ISA/237, 6 pgs.), dated Mar. 27, 2015.
(Continued)

*Primary Examiner* — Gilbert Y Lee
(74) *Attorney, Agent, or Firm* — Wood Herron & Evans LLP (57) ABSTRACT

The invention is a method for manufacturing a sealing joint, comprising coupling a first joint element (14) and a second joint element (20) to each other, and in the course of the coupling applying a first joint element (14) being made of metal and comprising a receiving neck (15) having a receiving aperture (13), and a second joint element (20) having a connecting neck (10) with a shape fitting into the receiving neck (15), being made of plastic comprising at least 90 wt % polymer, and being provided with a protrusion (12) formed around the connecting neck (10) and having a larger periphery than the receiving aperture (13), and manufacturing out of the material of the protrusion (12) in a high-elastic state of the polymer a round-formed sealing collar (28) providing a gas-tight seal between the connecting neck (10) and the receiving neck (15) by pressing the connecting neck (10) into the receiving aperture (13) by means of a force parallel with a longitudinal axis of the receiving neck (15), and by applying the receiving neck (15) for subjecting the (Continued)

protrusion (12) to permanent shear deformation. The invention is furthermore a sealing joint.

14 Claims, 7 Drawing Sheets

(51) Int. Cl.
    *F16J 15/10*     (2006.01)
    *B29C 65/56*     (2006.01)
    *B29C 65/64*     (2006.01)
    *B29C 65/00*     (2006.01)

(56) References Cited

U.S. PATENT DOCUMENTS

| | | | |
|---|---|---|---|
| 8,434,648 B2 | 5/2013 | Marie et al. | |
| 2006/0243940 A1* | 11/2006 | De Schrijver | B65D 83/46 251/299 |
| 2009/0078903 A1 | 3/2009 | Rideg | |

OTHER PUBLICATIONS

European Patent Office, International Preliminary Report of Patentability (Forms PCT/IPEA/416, 16 pgs.), dated Jun. 17, 2016.

\* cited by examiner

Fig. 8

SEALING JOINT AND A METHOD FOR MANUFACTURING THEREOF

This application claims priority, under Section 371 and/or as a continuation under Section 120, to PCT Application No. PCT/HU2014/000060, filed on Jul. 18, 2014.

TECHNICAL FIELD

The invention relates to a sealing joint between metal and plastic joint elements, and a method for manufacturing thereof.

BACKGROUND ART

The storage of two-component products, for example polyurethane foams, aerosols, automotive paints and varnishes, hair dyes, chemical—particularly household chemical—products, pharmaceutics, cosmetics, etc. often poses problems related to the storing of the second component.

In many cases, the second component is arranged in the inner space of the storing container (e.g. can) of the first component. In a variety of solutions, the container of the second component is connected to the wall of the outer container; in these cases the container of the second component may also be emptied from the outside of the container of the first component. Especially in these cases, but also in the case of other two-component storage facilities, it is a problem how to ensure gas-tight separation of the second container from the external environment and from the first container.

A two-part can adapted for storing two components is disclosed in EP 2 013 115 B1. In the approach described in the document, the inner container comprising the second component is connected by means of a plastic intermediate piece to the metal bottom of the can. The appropriate sealing of the plastic intermediate piece and the metal disc representing the bottom wall, in a way generally used in this special field, is provided by a flexible ring surrounding the matching neck sections of the metal disc and the plastic intermediate piece. When the container of the second component is so arranged, the material (by way of example liquefied gas) stored in the external container is separated from outside by the metal wall of the can, and a metal-plastic and a plastic-plastic joint. These joints represent vulnerable parts of the system adapted for storing the two components. Failing any of the joints making the storing system unsuitable for use, because in the case of imperfect sealing, gases from the environment may seep into the can and the inner content of the can may also escape.

In U.S. Pat. No. 6,264,205 B1, a seal around a shaft against low pressure fluids is provided by a plastic component suitable for permanent deformation. The disadvantage of the solution described by U.S. Pat. No. 6,264,205 B1 is that it provides seal only against low pressure fluids, and that in accordance with the configuration of the deforming plastic component, it is only suitable for providing a sealing around a shaft.

In U.S. Pat. No. 5,158,195, U.S. Pat. No. 5,579,944 and U.S. 2008/0029966 A1 sealing systems are disclosed wherein the purpose is to avoid the permanent deformation of the snapping component, in order to control the latching of the joints appropriately. Devices for mounting a valve on a container are disclosed in EP 1 052 190 A1 and EP 2 028 131 A2.

In view of known solutions, there is a demand for a sealing joint between plastic and metal joint elements, and a method for the manufacturing thereof, which sealing joint may be applied by way of example in containers adapted for storing two components, and in this case—unlike the prior art solutions—, it provides a gas-tight sealing more simply and/or more advantageously in the seals of a container adapted for storing two components, and which sealing joint may be applied advantageously also in other applications, wherein a sealing between metal and plastic components is needed.

DESCRIPTION OF THE INVENTION

The primary object of the invention is to provide a sealing joint and a method for manufacturing thereof, which are free of disadvantages of prior art solutions to the greatest possible extent.

A further object of the invention is to provide a sealing joint between plastic and metal joint elements and a method for the manufacturing thereof, which sealing joint may be applied by way of example in containers adapted for the storing two components, and in this case—unlike the prior art solutions—, it provides a gas-tight sealing more simply and/or more advantageously in the seals of a container adapted for storing two components, and which sealing joint may be applied advantageously also in other applications, wherein a sealing between metal and plastic components is needed.

The objects of the invention can be achieved by the method according to claim 1 and by the joint according to claim 14. Preferred embodiments of the invention are defined in the dependent claims.

BRIEF DESCRIPTION OF THE DRAWINGS

Preferred embodiments of the invention are described below by way of example with reference to the following drawings, where.

MODES FOR CARRYING OUT THE INVENTION

The method according to the invention is adapted for manufacturing a sealing joint. An embodiment of the method according to the invention is illustrated on FIGS. 1A to 5B.

Figure 5A:
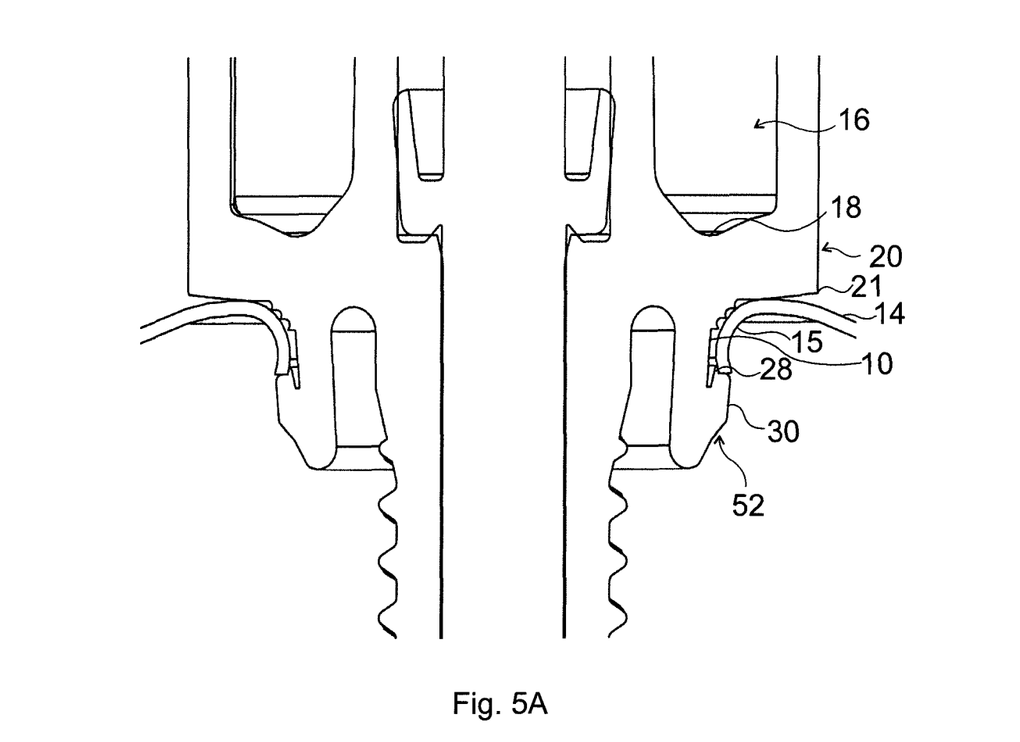
FIG. 5A is a cross-sectional side view showing the final state in the embodiments illustrated by FIGS. 1A-4B and an embodiment of the sealing joint according to the invention.
Figure 5B:
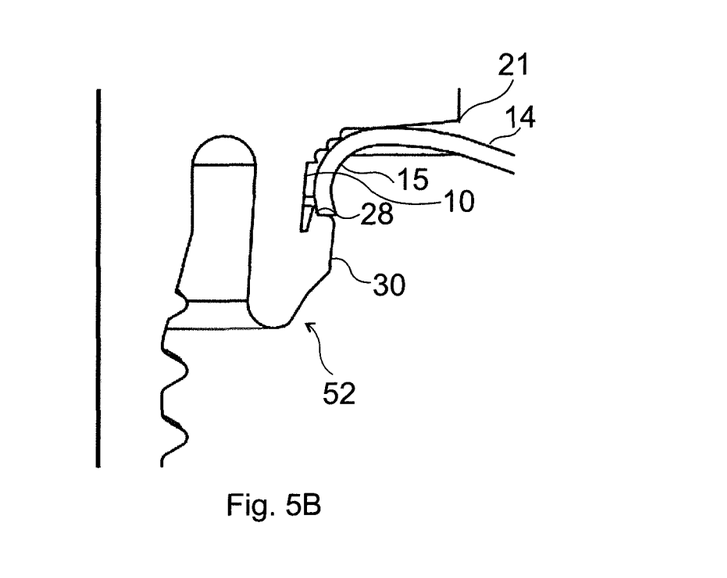
FIG. 5B is a drawing which shows a detail of FIG. 5A.

In the method according to the invention, a first joint element 14 and a second joint element 20 are coupled to each other. In the method according to the invention, in the course of the coupling the two joints, a first joint element 14 made of metal and comprising a receiving aperture 13 and a receiving neck 15, and a second joint element 20 made of plastic comprising at least 90 wt % polymer, having a connecting neck 10 with a shape fitting into the receiving neck 15, and provided with a protrusion 12 formed around the connecting neck 10 and having a larger periphery than the receiving aperture 13 are applied. In the method according to the invention, in a high-elastic state of the polymer, a round-formed sealing collar 28 providing a gas-tight seal between the connecting neck 10 and the receiving neck 15 is manufactured out of the material of the protrusion 12 by pressing the connecting neck 10 into the receiving aperture 13 by means of a force parallel with a longitudinal axis of the receiving neck 15, and by subjecting the protrusion 12 to permanent shear deformation by means of the receiving neck 15. The sealing collar 28 is shown in FIGS. 5A and 5B. Therefore, in the method according to the invention, a sealing joint is made between the first metal joint element 14 and the second plastic joint element 20 by manufacturing the sealing collar 28. Shearing by the receiving neck 15 means that a shearing effect is exerted on the protrusion 12 with the inner edge of the receiving aperture 13 of the receiving neck 15.

We have found in our experiments that below a polymer content of 90 wt %, the desired effects (permanent deformation) failed to occur. The second joint element 20 is preferably made of plastic comprising at least 95 wt % polymer, because according to our experiments it is advisable to use a plastic with as high a polymer content as possible, and comprises as few other materials (e.g. monomers, colouring, other additives) as possible. The applied plastic especially preferably comprises 98 to 99 wt % polymer, i.e. it comprises a different material content of up to 1 to 2 wt % only.

In the pressing process the high-elastic state of the polymer is preferably achieved by pressing the second joint element 20 into the receiving aperture 13 at room temperature, and applying a polymer which is in high-elastic state at room temperature. When describing the applicable materials, the meeting of this condition will also be demonstrated in these preferred embodiments. Pressing may be carried out theoretically also by bringing the second joint element into high-elastic state applying heating (or cooling), and performing the pressing at this temperature. In the method according to the invention, no heat is generated during the pressing process and no lubricant is needed. For manufacturing a single sealing joint by the method according to the invention, approx. 0.7 second is required. In the pressing process, depending on the strength of the applied second plastic joint element, the first joint element made of metal may slightly deformed. The material of the first joint element made of metal is e.g. steel.

Figure 1A:
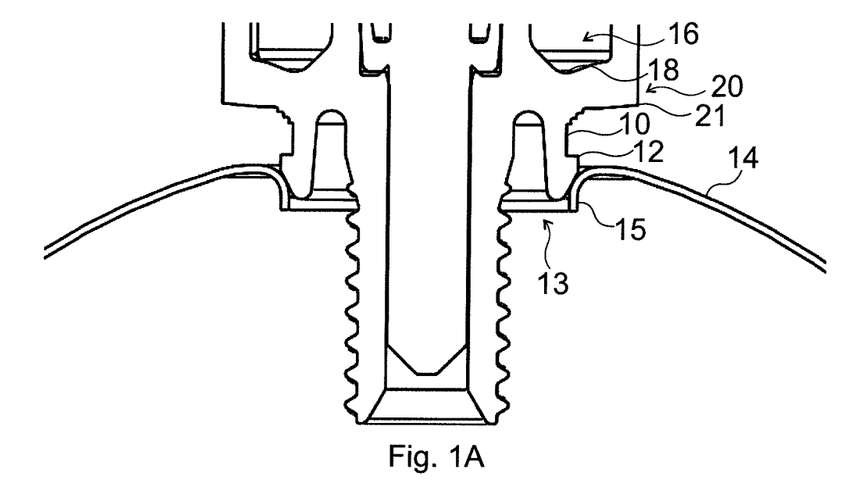
FIG. 1A is a cross-sectional side view illustrating an initial state of the method according to the invention.
Figure 1B:
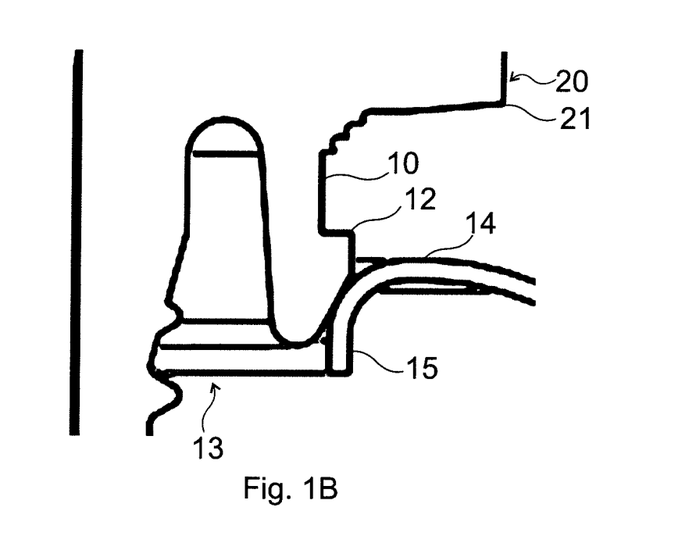
FIG. 1B is a drawing which shows a detail of FIG. 1A.

In FIG. 1A—and in FIG. 1B showing an important part of FIG. 1A from the aspect of the method—, an initial state of pressing is illustrated. Pressing of the second joint element 20 into the receiving aperture 13 may be carried out by placing the second joint element 20 on the receiving aperture 13 prior to pressing, and then starting the pressing of the second joint element 20 afterwards. In addition, by way of example, the pressing may be carried out by pressing the second joint element 20 by a pressing tool from the top without stopping, i.e. without the placement on the receiving aperture, into the receiving aperture.

FIG. 1A shows that the width of the connecting neck is substantially identical with the width of the receiving aperture 1310 taken in the section of the figure. The connecting neck 10 and the receiving neck 15 are preferably sized relative to each other and the unstressed state of the connecting neck 10 is adjusted in a way that after the pressing, the connecting neck 10, with the sealing collar 28 between the connecting neck 10 and the receiving neck 15, strains on the receiving neck 15. During the pressing, the protrusion is exposed to permanent deformation, but the connecting neck 10 carrying the protrusion is subjected to elastic deformation, due to the interaction with the receiving neck 15, in the direction of the longitudinal axis of the receiving neck 15. Thanks to this elastic deformation, it acts on (i.e. is strained against) the receiving neck 15, with a force pointing outwards from the longitudinal axis. This is also manifest in the embodiment of FIGS. 1A-1B; it is shown by FIGS. 1A-1B that the connecting neck 10 is not configured vertically, but slightly outwards from the common longitudinal axis of the connecting neck 10 and the receiving neck 15 in the direction downwards in the figure from the joint of the connecting neck 10 and the other parts of the second joint element 20. This configuration ensures that even after pressing, the elastic straining force pointing towards the receiving neck 15 is preserved in the connecting neck 10, and this said force presses the connecting neck 10 along its whole periphery to the receiving neck 15.

FIGS. 1A-1B also show that the protrusion 12 has a larger periphery than the receiving aperture 13. It is depicted by the figures that the protrusion 12 extends beyond the rounded upper part of the receiving neck 15. Due to this geometry, the second joint element 20 may only be pressed into the receiving aperture 13 by applying a predetermined force. The second joint element 20 is made of such a material which is subjected to permanent deformation under the impact of the pressing force and as a result of interaction with the first metal joint element 14 which has a higher strength.

From the aspect of the invention, the presence of permanent deformation is of primary importance; the first joint element 14 and the second joint element 20 are sized and made of such a material that the second joint element 20 may not elastically, i.e. without permanent deformation, snap into the receiving aperture 13 of the first joint element 14, because in this case the coupling between the first joint element 14 and the second joint element 20 would not seal appropriately. A gas-tight seal can be achieved by the creation of the sealing collar 28.

According to the invention for the vertical symmetry axis of FIG. 1A, circular symmetric first joint element 14 and second joint element 20 may be applied. In this case, the connecting neck of the second joint element has a cylindrical shape. Joint elements of other shapes may also be applied, for example instead of the joint elements of circular shape, joint elements having a lower symmetry, for example hexagonal or octagonal joint elements may be used, but the most advantageous solution is the application of joint elements having circular symmetry. In the case of the joint elements which are not of circular symmetry, it is advantageous if the corners of the characteristic two-dimensional profiles are rounded. Of course the round-formed protrusion is arranged on the second joint element even if such joint elements are utilised.

In the FIGS. 1A to 5B the process of pressing the second joint element 20 into the receiving aperture 13 can be followed. In FIGS. 1A-1B, the protrusion 12 sits on the edge of the receiving aperture 13; at this time the protrusion 12 is still in an undistorted state.

Figure 2A:
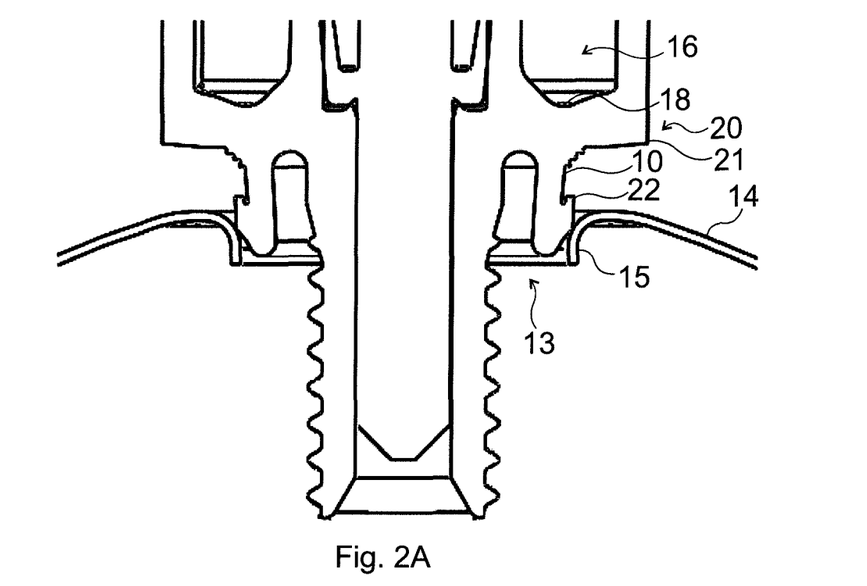
FIG. 2A is a cross-sectional side view showing an intermediate state of the method according to the invention.
Figure 2B:
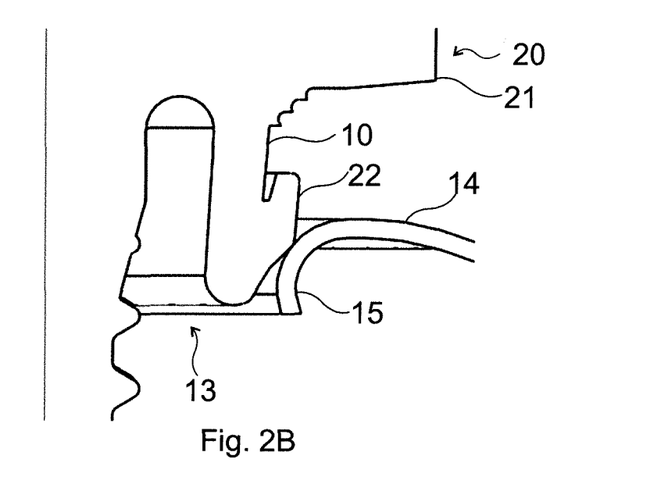
FIG. 2B is a drawing which depicts a detail of FIG. 2A.

FIGS. 2A-2B illustrate the starting of pressing of the second joint element 20. In some embodiments, the second joint element 20 is pressed into the receiving aperture 13 by means of a pressing tool. In these embodiments, furthermore, preferably a second joint element 20 having a pressing profile 16 adapted for coupling the pressing tool, arranged on the side opposite to the connecting neck 10 side of the second joint element 20 and having a longitudinal axis aligned with that of the connecting neck 10 is applied. In the embodiment shown in FIGS. 1A to 5B, the shape of the pressing profile 16 is cylindrical and it has a finite thickness. A pressing tool 38 shown in FIG. 6 may be fitted into this pressing profile 16.

In the present embodiment, the pressing tool 38 provided with a pressing edge 37 located circularly at the edge of the cylindrical shape pressing tool 38 (see FIGS. 5A-5B), and a pressing profile 16 fitted with a groove 18 suitable for coupling the pressing edge 37 are applied. In addition to the pressing profile 16, the groove 18 is also shown in FIGS. 1A to 5B. The line of the groove 18 is formed in a way that by shifting the groove 18 towards the connecting neck 10 along the longitudinal axis of the connecting neck 10, the groove 18 gets into the cross-section of the connecting neck 10. It can be ensured by the groove 18 of this configuration that the force exerted by the pressing tool 16 on the second joint element 20 is exactly concentrated to the connecting neck 10. When such a force is applied, it can be ensured that the connecting neck 10 is pressed into the receiving aperture 13 appropriately, and that the second plastic joint element 20 does not leave its shape during the pressing. If the groove is located along a larger or smaller periphery relative to the symmetry axis, the second joint element 20 itself could be distorted, thereby hindering the appropriate creation of the sealing collar 28.

FIGS. 2A and 2B illustrate an intermediate state of pressing. In this state, the permanent deformation of the protrusion 12 has already started, and the protrusion 12 assumes state 22 as shown in FIGS. 2A and 2B. The figures show that in the state 22, the material of the protrusion 12 starts to crease upwards, i.e. the receiving neck 15 makes a shearing effect on the protrusion 12. In the state shown in FIGS. 2A and 2B, the connecting neck 10 is pushed into the receiving aperture 13 to a larger extent than in FIGS. 1A-1B.

FIGS. 1A to 5B also depict steps located around the coupling of the connecting neck 10 and the further parts of the second joint element 20. These steps, in the final state shown in FIGS. 5A-5B, sit on the rounded edge of the receiving aperture 13 of the first joint element 14. This sitting (supporting) joint may contribute to the sealing, but it is unsuitable on its own to provide a gas-tight sealing.

Figure 3A:
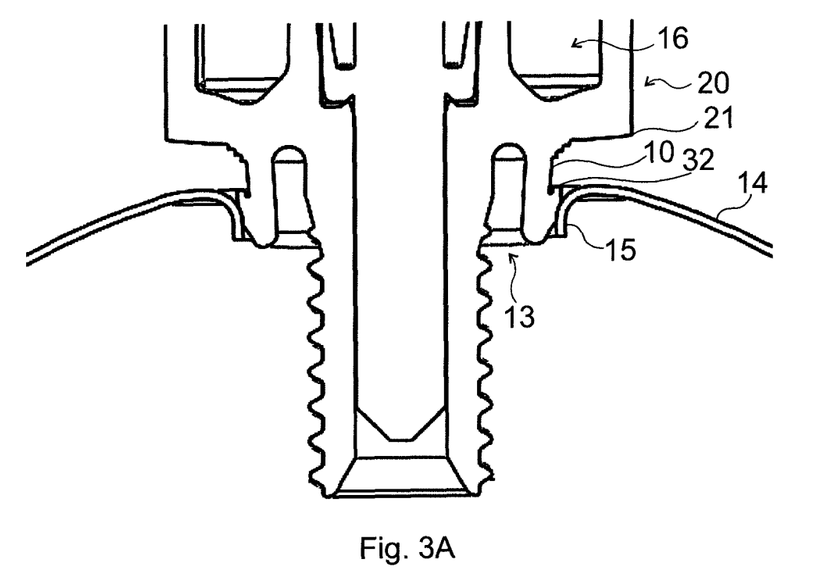
FIG. 3A is a cross-sectional side view depicting a further intermediate state of the method according to the invention.
Figure 3B:
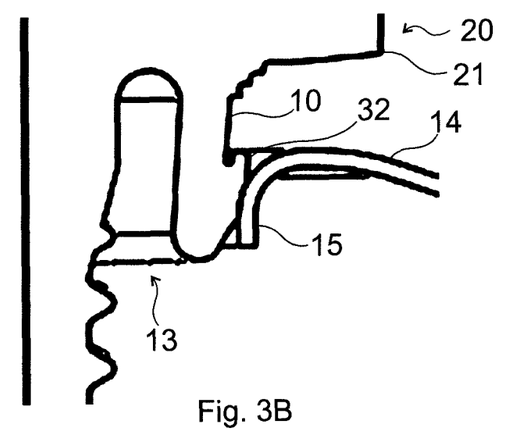
FIG. 3B is a drawing which shows a detail of FIG. 3A.

A further intermediate state of the pressing process is shown in FIGS. 3A-3B. In this state, the protrusion 12 is deformed even more, i.e. it is subjected even more to permanent deformation; the protrusion 12 assumes a state 32 in this intermediate state.

Figure 4A:
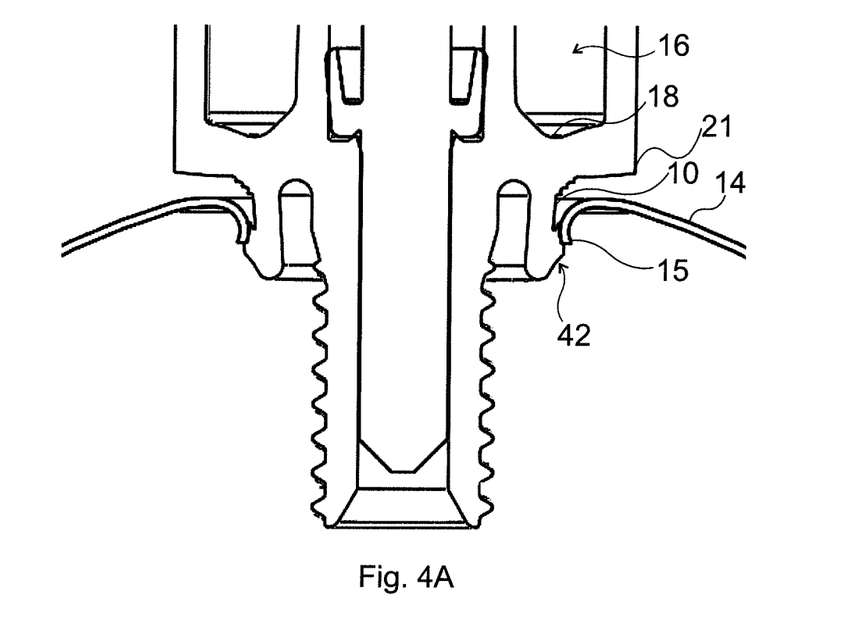
FIG. 4A is a cross-sectional side view depicting a yet further intermediate state of the method according to the invention.
Figure 4B:
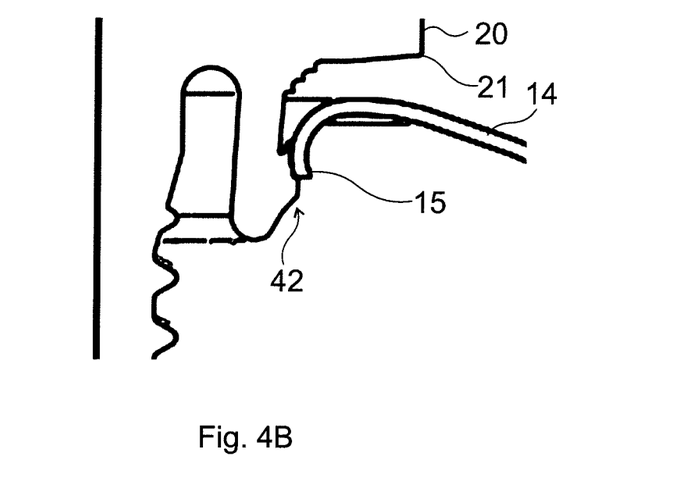
FIG. 4B is a drawing depicting a detail of FIG. 4A.

In the next pressing state shown in FIGS. 4A-4B, the protrusion 12 assumes a state 42. In the illustrated embodiment, a part of the protrusion 12 has already passed the receiving neck 15, and the accumulation of the material of the sealing collar between the connecting neck 10 and receiving neck 15 has started as shown in FIGS. 4A-4B. In this embodiment, the protrusion 12 is partly subjected to permanent shear deformation, and a remaining part 30 of the material of the protrusion 12 is passed through the receiving neck 15. The partial deformation of the protrusion 12 can be achieved by the appropriate dimensioning of the first joint element 14 and the second joint element 20. It is an advantage of this embodiment as a result of not shearing a part of the material of the protrusion 12 by the receiving neck 15, but passing this part through, that in the case of appropriate dimensioning, the slipping back of the second joint element 20 through the receiving neck 15 can be prevented. The permanent deformation of the protrusion 12 and the creation of the sealing collar 28 prevent the protrusion 12 from 'snapping over' the receiving neck 15, i.e. it is ensured that the protrusion 12 does not jump beyond the receiving neck 15.

FIGS. 5A and 5B depict the final state obtained by the method of the invention, and hence state 52 of the protrusion 12, in the embodiment also shown by FIGS. 1A to 4B. It is also shown in FIGS. 5A-5B that in the current embodiment, such a second joint element 20 is applied, in which the connecting neck 10 is coupled to a shoulder piece 21 being wider than the connecting neck 10, and the length of the connecting neck 10 parallel with the longitudinal axis is substantially identical with the sum of the lengths parallel with the longitudinal axis of the receiving neck 15 and the distorted protrusion, and pressing is carried out until the shoulder piece 21 rests on the first joint element 14. By this dimensioning, the final state of FIGS. 5A-5B can be achieved, where the longitudinal displacement of the pressed in second joint element 20 is prevented by the shoulder piece 21 and that part of the protrusion 12 which is passed through the receiving neck 15. This arrangement ensures very preferably the preservation of the gas-tight sealing provided by means of the sealing collar 28 is preserved. The displacement of the second joint element 20 normal to the longitudinal axis is prevented by the first joint element 14 which has a higher strength. The shorter the height of the receiving neck 15 in parallel with the longitudinal axis, proportionally the better the part between the connecting neck 10 and the receiving neck 15 is sealed.

FIGS. 4A to 5B show that the lower edge of the receiving neck 15 as depicted by the figures may turn slightly outwards from the symmetry axis (contrary to the straight design shown in FIGS. 1A to 3B). The permanent deformation of the second joint element 20 and the creation of the sealing collar 28 take place even with this receiving neck 15 slightly turning outwards.

The maintaining of the sealing effect may be ensured in different ways also, i.e. it may be achieved in other ways, by way of example through additional fixing to each other the first joint element 14 and the second joint element 20. Such an additional fixing may be applied by way of example, if there is no retaining shoulder piece on the second joint element 20 and/or the whole material of the protrusion 12 is sheared during permanent deformation, i.e. the whole material of the protrusion 12 gets into the sealing collar 28.

Figure 6:
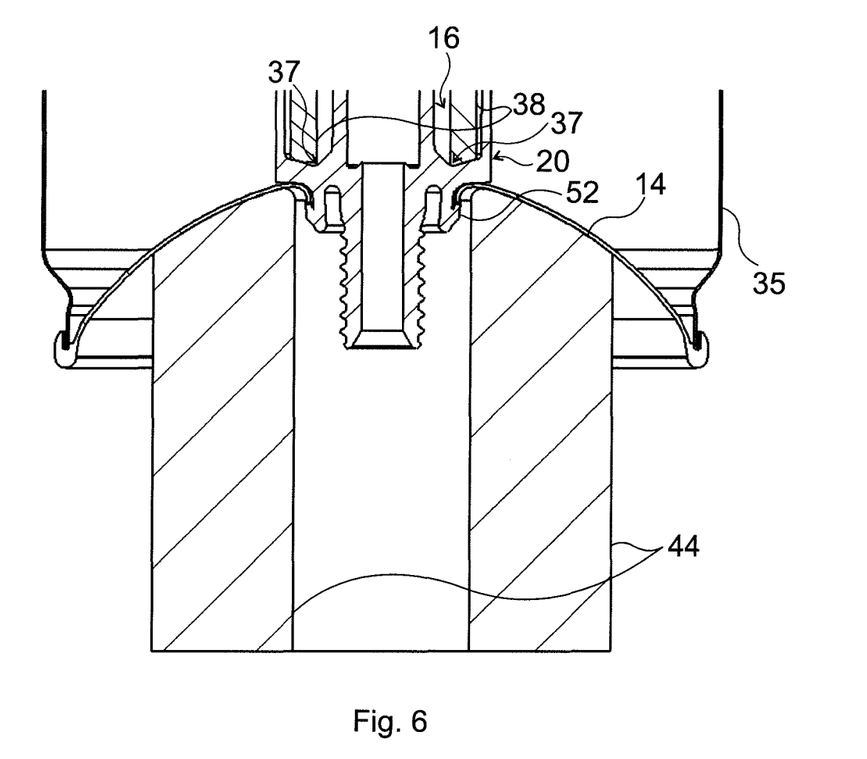
FIG. 6 is a cross-sectional side view illustrating an embodiment of the sealing joint according to the invention, with the pressing tool and holding tool applied in the method according to the invention.

In a very preferred embodiment of the method according to the invention, the second joint element 20 is positioned prior to pressing by means of the pressing tool 38 on the receiving aperture 13. In the present embodiment, the pressing tool 38 approaches slowly the second joint element 20 placed—and sometimes not sitting perfectly thereon—on the receiving aperture 13. Then, the pressing tool 38 is circularly introduced into the pressing profile 16, and by means of its pressing edge 35, it adjusts to its appropriate position the second joint element 20 through the application of a preliminary force. The second joint element 20 takes up the appropriate position when the pressing edge 35 is introduced into the groove 18 along the full length of the groove 18. In this state, the end of the pressing tool 38 is at a certain height, i.e. the condition can be well-defined when a pressing force is to be exerted by the pressing tool. In this state, the second joint element 20 will be appropriately centred, and therefore the circularly uniform forming of the sealing collar 28 can be provided preferably through the application of the preliminary force.

The circularly uniform configuration of the sealing collar can be ensured also in a different way, for example through the placement of the second joint element 20 on the receiving aperture 13 as centred or in a way that the pressing tool 38 is guided to the first joint element 14 together with the second joint element 20, while the pressing edge 35 and the groove 18 matches. In this case in a kind of easily—even automatically by removing the pressing tool—detached way the second joint element 20 may be fixed to the pressing tool 38.

FIGS. 1A to 6 are sectional drawings, i.e. these figures show also those parts of the sealing joint subassemblies, which are in the depicted part of the cross-section. Accordingly, in line with the depicted embodiment, the figures also show the circular character of the first joint element 14, the connecting neck 10 and the pressing profile 16. In the depicted embodiments, the longitudinal axes of the appropriate subassemblies are aligned, i.e. the alignment of the components to be pressed to each other, the pressing tool and the holding tool is satisfied. FIG. 6 shows the pressing tool 38 and a holding tool 44 which supports the first joint element 14.

FIG. 6 shows an embodiment, where the bottom cover member of a can 35 is applied as the first joint element 14. In the embodiment of FIG. 6, by means of the second joint element 14, a storing unit designed for storing the second component is preferably adjoined to the can 35 designed for the storing of the first component. FIG. 6 shows that in the system so established and adapted for the storage of two separate components, the sealing joint manufactured by the method according to the invention separates the first component from the medium surrounding the can 35. Accordingly, by means of the sealing joint obtained by the method according to the invention, the combination of a clamping ring type of metal-plastic joint and a further plastic-plastic joint applied in known systems adapted for the storage of two components can be avoided.

In the present embodiment, in order to preserve the sealing joint for a prolonged period, a type of plastic resistant to the first component, especially to the chemicals in the first component, is used. Accordingly, it is advisable to choose the material of the second joint element 20 taking into consideration the material to be stored in the can 35. In the present embodiment, furthermore, very low moisture permeability plastic is preferably applied. Therefore, in selecting the appropriate raw material, i.e. plastic, it is advisable to take into consideration the moisture permeability of the plastic, too. Of the plastics applicable by way of example, POM has a vapour permeability of approximately 0.01 to 0.3 $g*mm/(m^2*day)$ at room temperature. This means that approx. 0.01 to 0.3 g vapour is transferred daily on each square meter of the 1 mm thick material; and the water permeability of POM in the case of a 3 mm thick material is approx. 32 $g/(m^2*day)$; i.e. the vapour and water permeability of POM is extremely low.

According to the description above, it can be achieved that the sealing joint manufactured by the method according the invention is resistant to the chemicals of the material stored in the can 35, and that no moisture is introduced from the outside into the can 35, since the gas-tight sealing may be maintained for a long time. Thus, the condition of the contents of the can adapted for the storing of two components can be very preferably guaranteed. Gas-tight sealing also means that gas leakage, especially in the case of propane, butane and DME (dimethyl-ether) propelling gases generally applied in such cans, is of a negligible extent through the sealing.

The sealing joint manufactured by the method according to the invention can be used very preferred also in systems adapted for storing of two components, where the components of two-component PUR foam are filled into the can and into a second container arranged in and secured to the can by means of the second joint element. Therefore, in a way described by the invention, the prolonged and untroubled storage of the components of the two-component PUR foam can be provided for.

In our experiments we have demonstrated that for the storing of PUR foam, the sealing joint is to be manufactured preferably so that in the method according to the invention, high density polyethylene (HDPE), polyoxymethylene (POM) or polyvinylidene fluoride (PVDF) are used as a polymer.

Through the application of these raw materials, the obtained sealing joint will be resistant to the chemicals in the PUR foam and it will not allow the ingress of moisture from the environment or only to such an extent which is negligible from the aspect of the PUR foam warranty.

In the case of dimensions characterising the PUR foam cans, the diameter of the second joint element is approx. 1 mm larger than that of the receiving aperture. When POM is applied in the second joint element, in the case of such characteristic dimensions, the first joint element made of metal is also distorted by approx. 0.1 mm. When HDPE is applied, the deformation of the metal joint element is smaller than this, but this lower deformation is produced by a smaller pressing force.

The application of the above listed materials in the method according to the invention is very preferred also because these polymers are in high-elastic state at room temperature. Keeping the applied polymer in high-elastic state is required for executing the method according to the invention, because the appropriately high polymer content plastic applied in accordance with the invention is subjected to permanent deformation necessary for forming the sealing collar in high-elastic state of the polymer therein.

Amorphous polymers have three different physical states: glassy, high-elastic and melt. The semi-crystalline polymers are in a fourth state. In a crystalline physical state below the melting point, the polymers are always of the two-phase type, and they comprise amorphous and crystalline ranges simultaneously. The amorphous phase of a crystalline polymer may be high-elastic or glassy.

A characteristic of polymers is the glass transition temperature. This is the temperature at which some parts of the flexible chains forming the polymer, the segment movement begins. In high-elastic and melt states (the latter has characterising temperatures even higher than those associated with the high-elastic state), the segment movement results in the constantly changing shape of the molecules, and some chain sections are entangled or straightened without a displacement of the centre of gravity of the whole molecule. In equilibrium, the molecules of the amorphous polymers assume an entangled shape. Amorphous polymers are in high-elastic state between the glass transition temperature and the flowing temperature (above which characteristic temperature melt state is involved, in which the polymer becomes elastic), and the amorphous phase of the semi-crystalline polymers is between the glass transition temperature and the melting temperature in high-elastic state. Therefore, in the case of amorphous and semi-crystalline polymers, it is the flowing temperature and the melting temperature which determine the upper limit of the temperature range in which the polymer is in high-elastic state.

The deformation of polymers takes place according to three molecular mechanisms: the so-called energy elastic deformation, the so-called high-elastic deformation and the flow. The energy elastic deformation arises in all physical states and it precedes all types of deformation, but its extent is small. The extent of high-elastic deformation is larger, and accordingly in the case of a high deformation it entails permanent deformation. The deformation of so-called linear polymers is always accompanied by a certain extent of flow.

Therefore, if the pressing step is carried out at room temperature, those polymers can be applied in the method according to the invention, which are in high-elastic state at room temperature. Therefore, the polymers suitable from the aspect of chemical resistance may also be examined from the aspect of glass transition temperature (and flow or melting temperature) in accordance with Table 1. The flow and melting temperatures may be disregarded generally, because they are characteristically much higher than room temperature (characteristically they are above 100° C.).

TABLE 1

| Type of polymer | Glass transition temperature [° C.] | Is it appropriate? |
| --- | --- | --- |
| POM | −30 | Yes |
| PBT | 66 | No |
| HDPE | −80 | Yes |
| PVDF | −35 | Yes |

It can be seen therefore from Table 1 that PBT (polybutylene terephthalate) proving yet to be satisfactory from the aspect of chemical resistance is not suitable for use according to the invention in case the manufacturing process is carried out at room temperature, because its glass transition temperature (i.e. the temperature below which the relevant polymer is in a glassy state) is well above room temperature. According to our experience, PBT is highly susceptible for cracking. However, POM, HDPE and PVDF are appropriate. It is a limitation to the practical application of PVDF that PVDF is a raw material that may be obtained at a much higher price than POM and HDPE. POM has low, and HDPE and PVDF very low moisture permeability.

Figure 7:
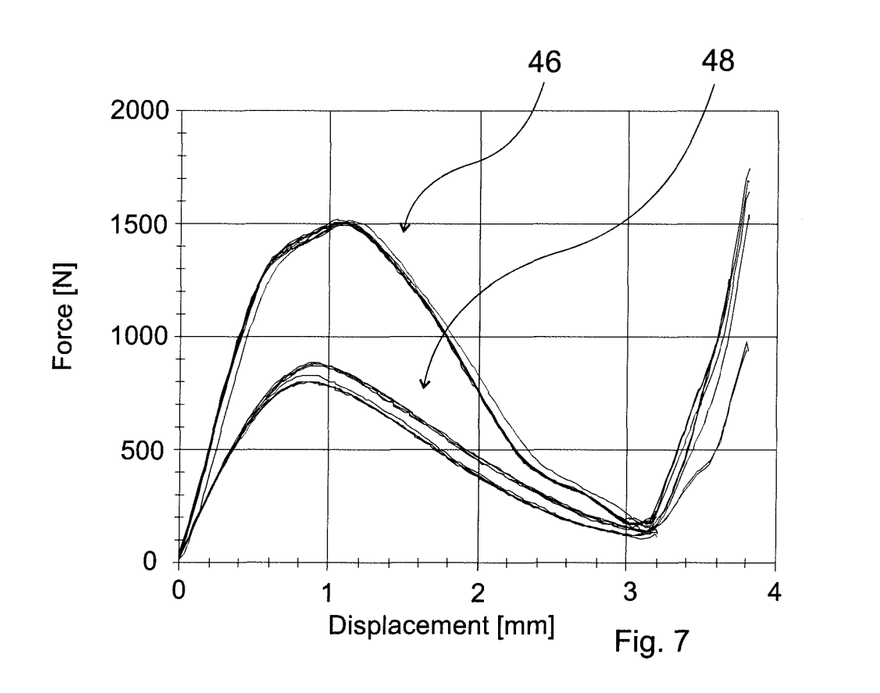
FIGS. 7 and 8 are diagrams showing the characteristics of the force to be measured in case of various plastics when the second plastic joint applied in the method according to the invention is inserted.
Figure 8:
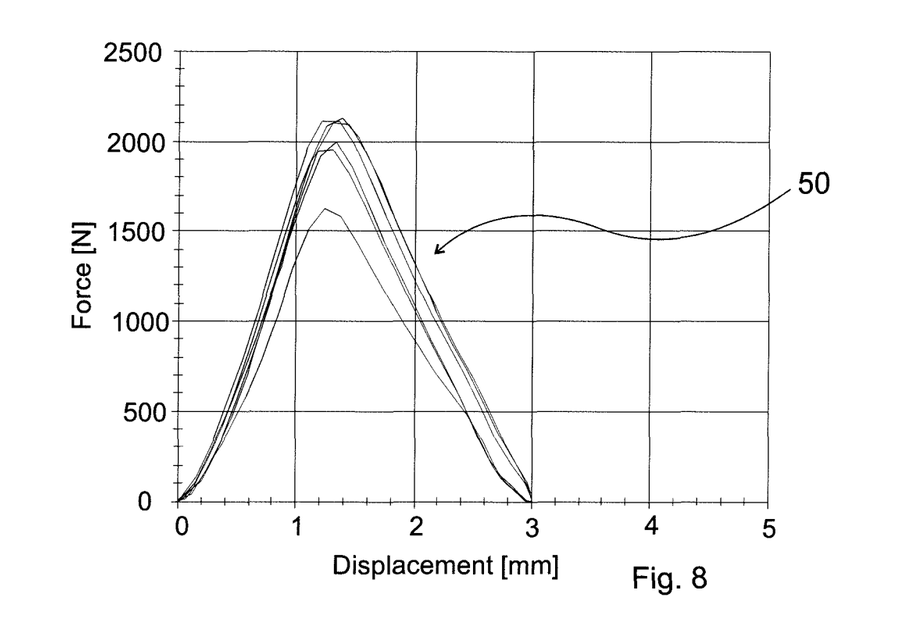

FIGS. 7 and 8 depict the displacement-force graphs taken during our experiments. Curves 46 shown in FIG. 7 have been obtained by the application of the second joint element comprising POM, by applying POM of various thicknesses and manufacturing methods. Curves 48 also of FIG. 7 have been taken through the application of HDPE of various thicknesses and manufacturing methods. Curves 50 shown in FIG. 8 have been obtained by the application of POM raw materials other than those mentioned above.

It is shown by the curves 46, 48 and 50 shown in FIGS. 7 and 8 that in the course of a 3 mm displacement applied in the example of the figure, a force of a peak rate, characteristically between 1500 and 2000N, higher than the pressing force of the second joint element comprising POM occurs, and in the case of the second joint elements of HDPE content, the force can be characterised by a peak rate ranging between 500 and 1000N characteristically. At the beginning of the pressing process, the magnitude of the force must be continuously increased, and then gradually reduced when the final state is approached. In the example shown, it is not necessary to push in the second joint element by more than 3 mm, and therefore the rates given in FIG. 7 for displacements larger than 3 mm are to be disregarded. The application of too high forces may lead to undesired deformations, and the extent of forces to be used depends on the selected material thicknesses. The strength of the second joint element is determined by its plastic components.

A further large advantage of applying POM and HDPE is that they have high resistance against cracking. This characteristic is especially preferred, because in manufacturing a gas-tight sealing it has outstanding importance that no cracks emerge in the plastic joint because of the permanent deformation of the second joint element comprising polymer. As an index of resistance to cracks, the so-called ESCR (Environmental Stress Crack Resistance) factor is usually applied. According to the ASTM D 1693 standard, the ESCR F50 B rate (100% Igepal CO-630) characterising the HDPE is 46 hours.

Some embodiments of the invention relate to a sealing joint. The sealing joint according to the invention comprises a first joint element 14 and a second joint element 20 coupled to each other. In the sealing joint according to the invention the first joint element 14 is made of metal and comprises a receiving neck 15 having a receiving aperture 13, and the second joint element 20 is made of plastic comprising at least 90 wt % polymer, has a connecting neck 10 with a shape fitting into the receiving neck 15, is provided with a protrusion 12 formed around the connecting neck 10 and having a larger periphery than the receiving aperture 13. Furthermore, the sealing joint according to the invention comprises a round-formed sealing collar 28 manufactured out of the material of the protrusion 12 in a high-elastic state of the polymer by pressing the connecting neck 10 into the receiving aperture 13 by means of a force parallel with a longitudinal axis of the receiving neck 15, and by subjecting the protrusion 12 to permanent shear deformation, and providing a gas-tight seal between the connecting neck 10 and the receiving neck 15.

The invention is, of course, not limited to the preferred embodiments described in details above, but further variants, modifications and developments are possible within the scope of protection determined by the claims.

The invention claimed is:

1. A method for manufacturing a sealing joint, said method comprising coupling a first joint element (14) and a second joint element (20) to each other,
characterised in that, in the course of the coupling,
applying a first joint element (14) being made of metal and comprising a receiving neck (15) having a receiving aperture (13), and a second joint element (20) having a connecting neck (10) with a shape fitting into the receiving neck (15), being made of plastic comprising at least 90 wt % polymer, and being provided with a protrusion (12) formed around the connecting neck (10) and having a larger periphery than the receiving aperture (13), and
manufacturing out of the material of the protrusion (12) in a high-elastic state of the polymer a round-formed sealing collar (28) providing a gas-tight seal between the connecting neck (10) and the receiving neck (15) by pressing the connecting neck (10) into the receiving aperture (13) by means of a force parallel with a longitudinal axis of the receiving neck (15), and by subjecting the protrusion (12) to permanent shear deformation by means of the receiving neck (15) during the pressing.

2. The method according to claim 1, characterised by applying a bottom sealing member of a can (35) as a first joint element (14).

3. The method according to claim 2, characterised in that a storage unit adapted for storing a second component is connected to a can (35) adapted for storing the first component by means of the second joint element (14).

4. The method according to claim 3, characterised by applying a plastic resistant to the first component, especially to the chemicals in the first component.

5. The method according to claim 4, characterised by applying high density polyethylene (HDPE), polyoxymethylene (POM) or polyvinylidene-fluoride (PVDF) as a polymer.

6. The method according to claim 1, characterised in that the protrusion (12) is partly subjected to permanent shear deformation, and a remaining part (30) of the material of the protrusion (12) is passed through the receiving neck (15).

7. The method according to claim 1, characterised in that in the second joint element (20) the connecting neck (10) is coupled to a shoulder piece (21) being wider than the connecting neck (10), and the length of the connecting neck (10) parallel with the longitudinal axis is substantially identical with the sum of the lengths parallel with the longitudinal axis of the receiving neck (15) and the distorted protrusion, and pressing is carried out until the shoulder piece (21) rests on the first joint element (14).

8. The method according to claim 1, characterised by pressing the second joint element (20) into the receiving aperture (13) by means of a pressing tool (38).

9. The method according to claim 8, characterised by positioning the second joint element (20) on the receiving aperture (13) prior to being pressed by means of the pressing tool (38).

10. The method according to claim 8, characterised in that the second joint element (20) is adapted for coupling the pressing tool (38), is arranged on the side opposite to the connecting neck (10) side of the second joint element (20), and has a pressing profile (16) with a longitudinal axis aligned with that of the connecting neck (10).

11. The method according to claim 10, characterised in that the pressing tool (38) has a circular pressing edge (37) and the pressing profile (16) has a groove (18) adapted for coupling the pressing edge (37), and the line of the groove (18) is formed in a way that by shifting the groove (18) towards the connecting neck (10) along the longitudinal axis of the connecting neck (10), the groove (18) gets into the cross-section of the connecting neck (10).

12. The method according to claim 1, characterised by pressing the second joint element (20) into the receiving aperture (13) at room temperature, and such a polymer is applied which is in high-elastic state at room temperature.

13. The method according to claim 1, characterised in that the second joint element (20) has a cylindrical connecting neck (10).

14. A sealing joint comprising a first joint element (14) and a second joint element (20) coupled to each other, characterised in that the first joint element (14) is made of metal and comprises a receiving neck (15) having a receiving aperture (13), the second plastic joint element (20) is made of plastic comprising at least 90 wt % polymer, has a connecting neck (10) with a shape fitting into the receiving neck (15), is provided with a protrusion (12) formed around the connecting neck (10) and the protrusion (12) having a larger periphery than the receiving aperture (13), and it comprises a round-formed sealing collar (28) being manufactured out of the material of the protrusion (12) in a high-elastic state of the polymer by pressing the connecting neck (10) into the receiving aperture (13) by means of a force parallel with a longitudinal axis of the receiving neck (15) and by subjecting the protrusion (12) to a permanent shear deformation by means of the receiving neck (15) during the pressing, the sealing collar (28) providing a gas-tight seal between the connecting neck (10) and the receiving neck (15).

* * * * *